(12) United States Patent
    Sakamoto et al.

(10) Patent No.: US 10,073,286 B2
(45) Date of Patent: Sep. 11, 2018

(54) SUBSTRATE-TYPE OPTICAL WAVEGUIDE AND SUBSTRATE-TYPE OPTICAL MODULATOR

(71) Applicant: FUJIKURA LTD., Tokyo (JP)

(72) Inventors: Shinichi Sakamoto, Sakura (JP); Norihiro Ishikura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/448,895

(22) Filed: Mar. 3, 2017

(65) Prior Publication Data

US 2017/0329158 A1   Nov. 16, 2017

(30) Foreign Application Priority Data

May 16, 2016   (JP) .................................. 2016-098131

(51) Int. Cl.
    G02B 6/122       (2006.01)
    G02F 1/025       (2006.01)
    G02F 1/225       (2006.01)
    G02F 1/21        (2006.01)

(52) U.S. Cl.
    CPC ............ G02F 1/025 (2013.01); G02F 1/2255 (2013.01); *G02F 2001/212* (2013.01); *G02F 2201/063* (2013.01)

(58) Field of Classification Search
    USPC ............................................... 385/3
    See application file for complete search history.

(56) References Cited

U.S. PATENT DOCUMENTS

| | | | |
|---|---|---|---|
| 8,149,493 B2 * | 4/2012 | Chen ....................... | G02F 1/025 359/250 |
| 2014/0233878 A1 * | 8/2014 | Goi ........................ | G02F 1/2257 385/3 |
| 2015/0293427 A1 * | 10/2015 | Goi ......................... | G02F 1/025 385/3 |
| 2016/0011439 A1 * | 1/2016 | Kitamura ................ | G02F 1/218 385/2 |
| 2016/0054639 A1 * | 2/2016 | Kono .................... | G02F 1/2255 385/2 |
| 2016/0159381 A1 * | 6/2016 | Fahmy ................ | B61L 15/0081 701/19 |

FOREIGN PATENT DOCUMENTS

JP          2012-27198 A       2/2012

* cited by examiner

*Primary Examiner* — Eric Wong
(74) *Attorney, Agent, or Firm* — Westerman, Hattori, Daniels & Adrian, LLP

(57) ABSTRACT

The substrate-type optical waveguide includes a rib-slab type core. A depletion layer exists in a rib part and, in any cross section of the core, a width of a first slab part is set to be greater than a width of a second slab part.

10 Claims, 2 Drawing Sheets

SUBSTRATE-TYPE OPTICAL WAVEGUIDE AND SUBSTRATE-TYPE OPTICAL MODULATOR

Figure 1:
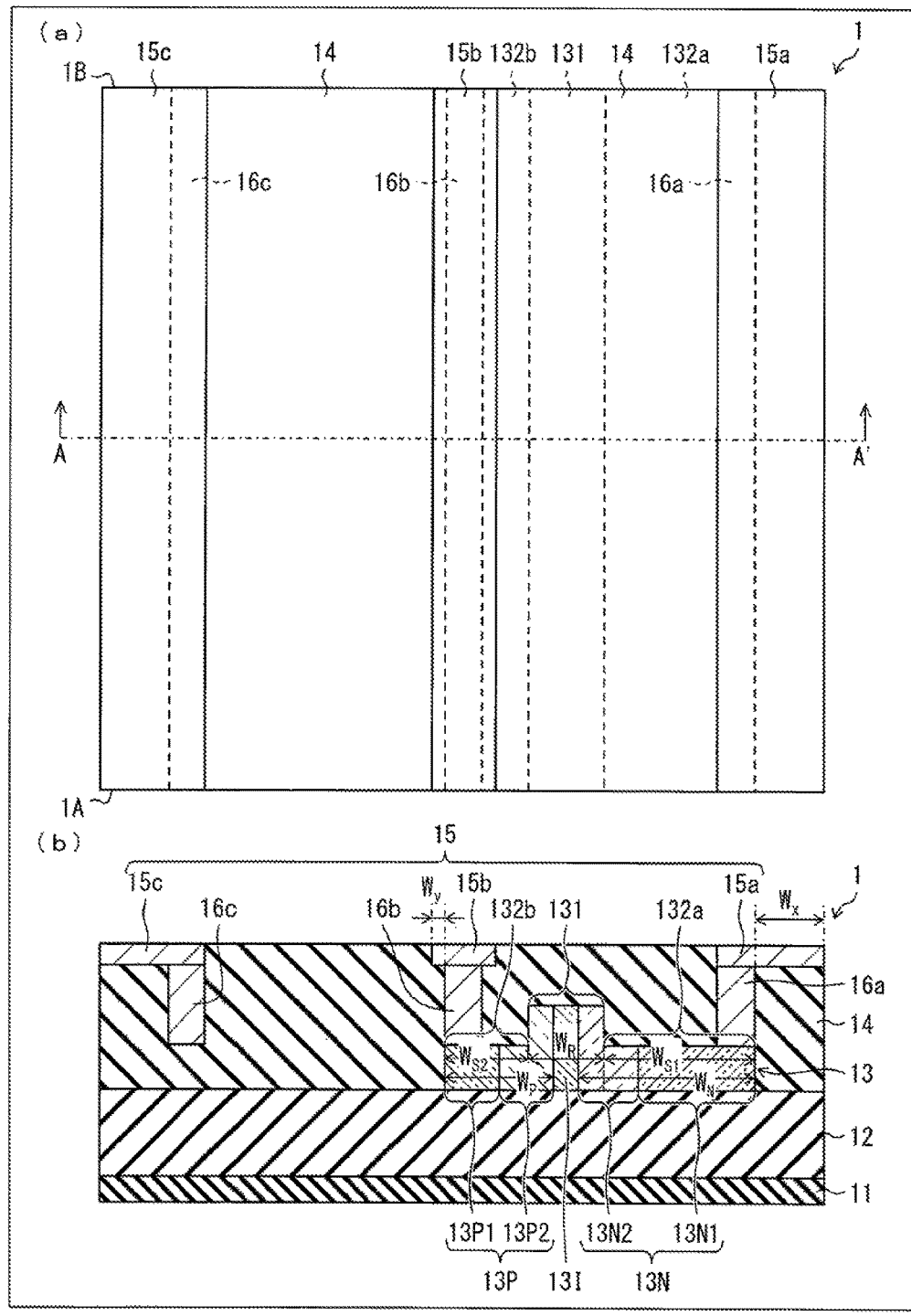

This Nonprovisional application claims priority under 35 U.S.C. § 119 on Patent Application No. 2016-098131 filed in Japan on May 16, 2016, the entire contents of which are hereby incorporated by reference.

TECHNICAL FIELD

The present invention relates to a substrate-type optical waveguide having a phase modulation function. Moreover, the present invention relates to a substrate-type optical modulator which includes the substrate-type optical waveguide as a phase modulating section.

BACKGROUND ART

In recent years, a substrate-type optical waveguide having a phase modulation function has been widely used as a part of an optical modulator which is mounted on an optical transmitter. For example, a substrate-type optical waveguide which includes a silicon on insulator (SOI) substrate as a base includes (1) a base layer containing silicon (Si) as a main component, (2) a lower cladding layer which is laminated on the base layer and contains silica ($SiO_2$) as a main component, and (3) a core which is provided on the lower cladding layer and contains silicon (Si) as a main component.

The core of the substrate-type optical waveguide having the phase modulation function includes an N-type semiconductor region, a P-type semiconductor region, and a depletion layer that exists between those regions. An effective refractive index of the core is determined in accordance with a size of the depletion layer, and the size of the depletion layer can be changed in accordance with a magnitude of a voltage which is applied between the N-type semiconductor region and the P-type semiconductor region. Therefore, it is possible to modulate a phase of light propagating through the core by applying a signal voltage between the N-type semiconductor region and the P-type semiconductor region.

For example, Patent Literatures 1 and 2 disclose substrate-type optical waveguides having such a phase modulation function. In each of the substrate-type optical waveguides disclosed in Patent Literatures 1 and 2 ("phase shifter" in Patent Literature 1 and "optical Semiconductor device" in Patent Literature 2), a rib-slab type care ("wave guide" in Patent Literature 1 and "semiconductor layer" in Patent Literature 2) is used. Here, the rib-slab type core is a core having an inverted T-shaped cross section (which is a cross section perpendicular to a traveling direction of light propagating through the core), that is, a core having a rib part which is relatively greater in height (i.e., greater in thickness) and slab parts which are located on both sides of the rib part and are relatively smaller in height (i.e., smaller in thickness).

In the rib-slab type core, light guided therein is concentrated on the rib part. From this, in a case where the N-type semiconductor region and the P-type semiconductor region are arranged such that the depletion layer exists in the rib part, it is possible to reduce a voltage (hereinafter, referred to as "operating voltage") $V_{pi}$ which is to be applied between the N-type semiconductor region and the P-type semiconductor region in order to control an effective refractive index of the core to a predetermined value, and it is thus possible to reduce power consumption.

CITATION LIST

Patent Literature

[Patent Literature 1]
U.S. Pat. No. 8,149,493 (Publication Date: Apr. 3, 2014)
[Patent Literature 2]
Japanese Patent Application Publication, Tokukai No. 2012-27198 (Publication Date: Feb. 9, 2012)

SUMMARY OF INVENTION

Technical Problem

In the substrate-type optical waveguide having the phase modulation function, there is a high frequency loss which can be approximated by a formula (1) below, where R, C, and L represent a resistance, a capacitance, and an inductance of the substrate-type optical waveguide, respectively. In a conventional substrate-type optical waveguide, it has been difficult to reduce the high frequency loss, as described below.

[Math. 1]

$$\alpha = \frac{\omega}{2}\sqrt{LC}\left(\frac{R}{\omega L} + \omega RC\right) \quad (1)$$

As is clear from the formula (1), in a frequency domain in which $R/\omega L \ll \omega RC$, the high frequency loss is proportional to the 3/2 power of a capacitance C and is proportional to the 1/2 power of an inductance L. Therefore, the high frequency loss in the frequency domain in which $R/\omega L \ll \omega RC$ can be reduced by decreasing the capacitance C.

The capacitance C of the substrate-type optical waveguide is a sum of (i) a capacitance (hereinafter, also referred to as "depletion layer capacitance") C1 which is generated because the N-type semiconductor layer and the P-type semiconductor layer face with each other via the depletion layer and (ii) a capacitance (hereinafter, also referred to as "lower cladding layer capacitance") C2 which is generated because the N-type semiconductor layer and the base layer face with each other via the lower cladding layer and the P-type semiconductor layer and the base layer face with each other via the lower cladding layer.

The capacitance C of the substrate-type optical waveguide can be decreased by, for example, lowering carrier densities in the P-type semiconductor region and the N-type semiconductor region and thus making the depletion layer capacitance C1 smaller. However, in a case where the carrier densities in the P-type semiconductor region and the N-type semiconductor region are lowered, it is necessary to increase the voltage $V_{pi}$ which is to be applied between the N-type semiconductor region and the P-type semiconductor region in order to control the effective refractive index of the core to the predetermined value, and this consequently leads to increase in power consumption.

The present invention is accomplished in view of the problem, and its object is to reduce a high frequency loss without increasing power consumption as compared with conventional techniques in a substrate-type optical waveguide having a phase modulation function and in a substrate-type optical modulator including such a substrate-type optical waveguide as a phase modulating section.

Solution to Problem

In order to attain the object, a substrate-type optical waveguide in accordance with an aspect of the present invention includes: a base layer; a lower cladding layer which is laminated on the base layer; and a core which is a rib-slab type core provided on the lower cladding layer, the core having an N-type semiconductor region, a P-type semiconductor region, and a depletion layer which exists between the N-type semiconductor region and the P-type semiconductor region, the depletion layer existing in a rib part of the core, and, in any cross section of the core, a width of a first slab part of the core being greater than a width of a second slab part of the core so that a width of the N-type semiconductor region which includes a part of the core and the first slab part or the second slab part becomes different from a width of the P-type semiconductor region which includes a part of the core and the second slab part or the first slab part.

Advantageous Effects of Invention

According to an aspect of the present invention, in the substrate-type optical waveguide having a phase modulation function and in the substrate-type optical modulator including such a substrate-type optical waveguide as a phase modulating section, it is possible to decrease a capacitance without lowering carrier densities in the P-type semiconductor region and the N-type semiconductor region, that is, it is possible to reduce a high frequency loss without increasing power consumption as compared with conventional techniques.

BRIEF DESCRIPTION OF DRAWINGS (a) of FIG. 1 is a plan view illustrating a substrate-type optical waveguide in accordance with an embodiment of the present invention, and (b) of FIG. 1 is a cross-sectional view of the substrate-type optical waveguide taken along the line A-A' in (a) of FIG. 1.

Figure 2:
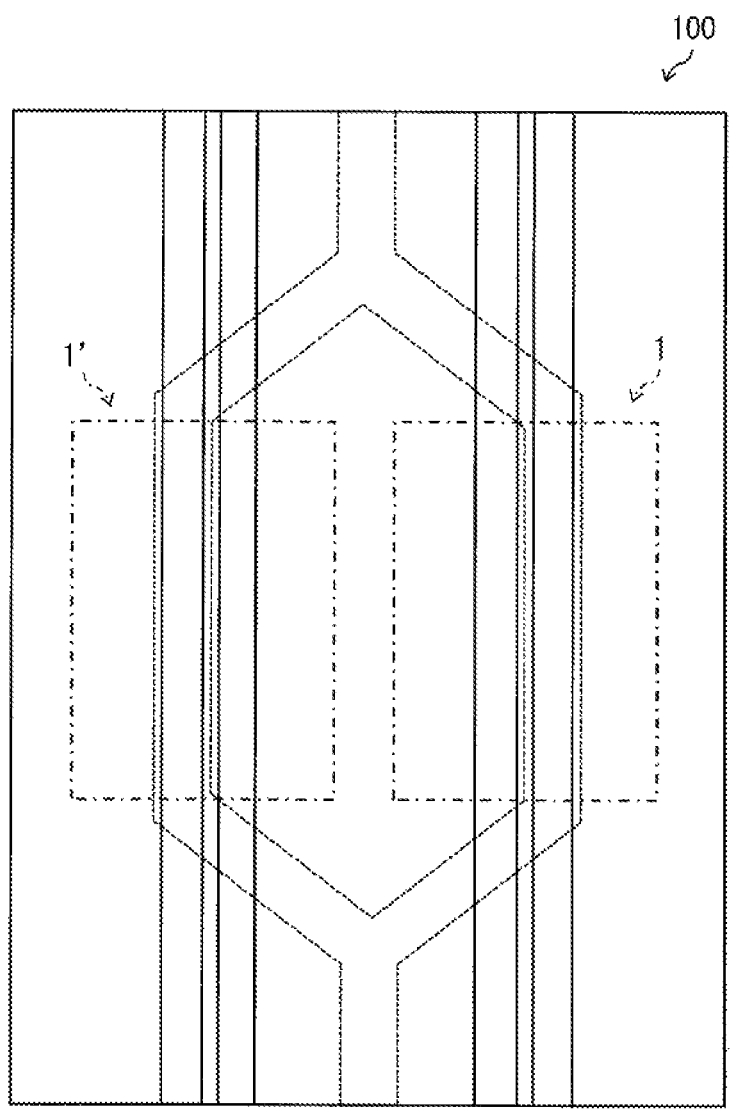

FIG. 2 is a plan view illustrating a substrate-type optical modulator which includes the substrate-type optical waveguide illustrated in FIG. 1 as a phase modulating section.

DESCRIPTION OF EMBODIMENTS

[Configuration of Substrate-Type Optical Waveguide]

The following description will discuss a configuration of a substrate-type optical waveguide 1 in accordance with an embodiment of the present invention, with reference to FIG. 1. (a) of FIG. 1 is a plan view illustrating the substrate-type optical waveguide 1, and (b) of FIG. 1 is a cross-sectional view of the substrate-type optical waveguide 1 taken along the line A-A' in (a) of FIG. 1. The substrate-type optical waveguide 1 has a phase modulation function and is used as, for example, a part of a substrate-type optical modulator.

As illustrated in (b) of FIG. 1, the substrate-type optical waveguide 1 includes (1) a base layer 11 which is a conductor or a semiconductor, (2) a lower cladding layer 12 which is an insulator laminated on the base layer 11, (3) a core 13 which is a semiconductor provided on the lower cladding layer 12, (4) an upper cladding layer 14 which is an insulator laminated on the lower cladding layer 12 so that the core 13 is embedded between the lower cladding layer 12 and the upper cladding layer 14, and (5) a pair of electrodes 15 including a first electrode 15a and a second electrode 15b which are provided on an upper surface of the upper cladding layer 14. The first electrode 15a and the second electrode 15b constitute a coplanar line together with a third electrode 15c (the second electrode 15b serves as a signal electrode, and the first electrode 15a and the third electrode 15c serve as ground electrodes).

Each of the lower cladding layer 12 and the upper cladding layer 14 is made of a medium which has a refractive index higher than that of a medium constituting the core 13, and this allows the core 13 to function as an optical waveguide. In the present embodiment, the core 13 contains silicon (Si) as a main component, and each of the lower cladding layer 12 and the upper cladding layer 14 contains, as a main component, silica ($SiO_2$) whose refractive index is higher than that of silicon. With the configuration, light which has entered the core 13 via an incident edge surface 1A propagates from the incident edge surface 1A to an emission edge surface 1B while being confined in the core 13, and is then emitted from the core 13 via the emission edge surface 1B. That is, the core 13 serves as an optical waveguide.

Note that, in the present embodiment, the base layer 11 contains silicon as a main component. Therefore, the substrate-type optical waveguide 1 can be produced from a silicon on insulator (SOI) substrate in which a first silicon layer, a silica layer (BOX layer), and a second silicon layer are stacked in this order.

In order for the core 13, which serves as the optical waveguide, to further serve as a phase modulator, the core 13 has an N-type semiconductor region 13N and a P-type semiconductor region 13P which face with each other via a plane that is perpendicular to both an upper surface of the lower cladding layer 12 and a cross section of the core 13 (i.e., a cross section which is perpendicular to a traveling direction of light guided in the core 13). Here, the N-type semiconductor region 13N is a region doped with pentads such as phosphorus and serves as an N-type semiconductor. The P-type semiconductor region 13P is a region doped with triads such as boron and serves as a P-type semiconductor. One of the N-type semiconductor region 13N and the P-type semiconductor region 13P (in the present embodiment, the N-type semiconductor region 13N) is connected with the first electrode 15a via a first through electrode 16a across an entire section from the incident edge surface 1A to the emission edge surface 1B, and the other of the N-type semiconductor region 13N and the P-type semiconductor region 13P (in the present embodiment, the P-type semiconductor region 13P) is connected with the second electrode 15b via a second through electrode 16b across an entire section from the incident edge surface 1A to the emission edge surface 1B. Therefore, in a case where a signal voltage is applied between the pair of electrodes 15, a depletion layer 13I having a width corresponding to the signal voltage is formed in the vicinity of a boundary between the N-type semiconductor region 13N and the P-type semiconductor region 13P. As a result, an effective refractive index of the core 13 changes into a value corresponding to the signal voltage. From this, signal light which has entered the core 13 via the incident edge surface 1A is subjected to phase modulation while propagating through the core 13. That is, the core 13 serves as a phase modulator.

In the present embodiment, a configuration is employed in which the core 13 is a rib-slab type and the depletion layer 13I is formed in a rib part 131. Here, "the core 13 is a rib-slab type" means that a cross section of the core 13 is an inverted T-shape, that is, the core 13 is constituted by a rib part 131 which is relatively greater in height (i.e., greater in thickness) and slab parts 132a and 132b which are located on both sides of the rib part 131 and are relatively smaller in height (i.e., smaller in thickness). In the rib-slab type core 13, it is possible to cause light, which is propagating through the core 13, to be unevenly distributed in the rib part 131. Therefore, by forming the depletion layer 13I in the rib part 131, it is possible to efficiently control a refractive index of a region in which light propagating through the core 13 is unevenly distributed.

[Characteristic of Substrate-Type Optical Waveguide]

A first characteristic of the substrate-type optical waveguide 1 in accordance with the present embodiment is that a configuration is employed in which, in any cross section of the core 13, a width $W_{S1}$ of the first slab part 132a is greater than a sum of a width $W_{S2}$ of the second slab part 132b and a width $W_R$ of the rib part 131 (see (b) of FIG. 1).

By employing the above configuration, it is possible to make the width $W_N$ of the N-type semiconductor region 13N different from the width $W_P$ of the P-type semiconductor region 13P in any cross section of the core 13, regardless of a location of the depletion layer 13I in the rib part 131. This makes it possible to reduce the lower cladding layer capacitance C2, as compared with a case where the width $W_N$ of the N-type semiconductor region 13N is equal to the width $W_P$ of the P-type semiconductor region 13P (for a reason for this, refer to the descriptions in [Solution to Problem]). Therefore, it is possible to decrease the capacitance C=C1+C2 of the substrate-type optical waveguide 1 without decreasing the depletion layer capacitance C1. That is, it is possible to reduce the high frequency loss without increasing the power consumption.

Note that the present invention is accomplished even if the condition "in any cross section of the core 13, a width $W_{S1}$ of the first slab part 132a is greater than a sum of a width $W_{S2}$ of the second slab part 132b and a width $W_R$ of the rib part 131" is eased to a condition "in any cross section of the core 13, a width $W_{S1}$ of the first slab part 132a is greater than a width $W_{S2}$ of the second slab part 132b". This is because, even in such a case, it is possible to make the width $W_N$ of the N-type semiconductor region 13N different from the width $W_P$ of the P-type semiconductor region 13P in any cross section of the core 13, except for a case where a location of the depletion layer 13I in the rib part 131 is extremely closer to the first slab part 132a.

A second characteristic of the substrate-type optical waveguide 1 in accordance with the present embodiment is, as illustrated in (b) of FIG. 1, that the configuration is employed in which (i) the N-type semiconductor region 13N is formed in the first slab part 132a which is wider and a part of the rib part 131 which is adjacent to the first slab part 132a and (ii) the P-type semiconductor region 13P is formed in the second slab part 132b which is narrower and a part of the rib part 131 which is adjacent to the second slab part 132b.

A mobility of carriers in the N-type semiconductor region 13N is higher than that in the P-type semiconductor region 13P. Therefore, by employing the configuration, it is possible to reduce the resistance R of the substrate-type optical waveguide 1 expressed in the formula (1) and consequently the high frequency loss can be reduced, as compared with a case where regions for forming the N-type semiconductor region 13N and the P-type semiconductor region 13P are inverted.

A third characteristic of the substrate-type optical waveguide 1 in accordance with the present embodiment is, as illustrated in (b) of FIG. 1, that a configuration is employed in which a width Wx of a part of the first electrode 15a which part faces with the base layer 11 without via the core 13 is greater than a width Wy of a part of the second electrode 15b which part faces with the base layer 11 without via the core 13.

In a case where the first electrode 15a has the part which faces with the base layer 11 without via the core 13, a capacitance between the first electrode 15a and the base layer 11 is added to the capacitance $C_N$ between the N-type semiconductor region 13N and the base layer 11. Similarly, in a case where the second electrode 15b has the part which faces with the base layer 11 without via the core 13, a capacitance between the second electrode 15b and the base layer 11 is added to the capacitance $C_P$ between the P-type semiconductor region 13P and the base layer 11. By employing, the configuration, even in such a case, the lower cladding layer capacitance C2 does not become a maximum. Therefore, by employing the configuration, it is possible to decrease the lower cladding layer capacitance C2, as compared with a case where the width $W_N$ of the N-type semiconductor region 13N is equal to the width $W_P$ of the P-type semiconductor region 13P.

A fourth characteristic of the substrate-type optical waveguide 1 in accordance with the present embodiment is, as illustrated in (b) of FIG. 1, that the configuration is employed in which a width of the first electrode 15a which serves as a ground electrode of a coplanar line is greater than a width of the second electrode 15b which serves as a signal electrode of the coplanar line.

By employing the configuration, it is possible to reduce crosstalk between signal electrodes which are adjacent to each other. Specifically, it is possible to reduce crosstalk that is generated (i) between the second electrode (signal electrode) 15b and a signal electrode (not illustrated) that is located on the right of the first electrode (ground electrode) 15a in FIG. 1 or (ii) between the second electrode (signal electrode) 15b and a signal electrode (not illustrated) that is located on the left of the third electrode (ground electrode) 15c in FIG. 1.

A fifth characteristic of the substrate-type optical waveguide 1 in accordance with the present embodiment is, as illustrated in (b) of FIG. 1, that a configuration is employed in which (1) the N-type semiconductor region 13N is divided into a high-doped region 13N1 and a low-doped region 13N2, the high-doped region 13N1 being in the first slab part 132a, being far from the P-type semiconductor region 13P, and being relatively high in concentration of the dopant (additive), and the low-doped region 13N2 being in the first slab part 132a, being near to the P-type semiconductor region 13P, and being relatively low in concentration of the dopant, and (2) the P-type semiconductor region 13P is divided into a high-doped region 13P1 and a low-doped region 13P2, the high-doped region 13P1 being in the second slab part 132b, being far from the N-type semiconductor region 13N, and being relatively high in concentration of the dopant, and the low-doped region 13P2 being in the second slab part 132b, being near to the N-type semiconductor region 13N, and being relatively low in concentration of the dopant.

By employing the configuration, it is possible to reduce concentrations of the dopant in and in the vicinity of the rib part 131 in which light propagating through the core 13 is unevenly distributed. Therefore, it is possible to reduce a loss that is generated when light propagating through the core 13 is scattered or absorbed by the dopant.

APPLICATION EXAMPLE

The following description will discuss a substrate-type optical modulator 100 which includes the above described substrate-type optical waveguide 1 as a phase modulating section, with reference to FIG. 2. FIG. 2 is a top view illustrating the substrate-type optical modulator 100.

The substrate-type optical modulator 100 is a Mach-Zehnder optical modulator in which lights which have been subjected to phase modulation on two light paths are caused to interfere with each other, and thus light whose intensity has been modulated is obtained. The substrate-type optical modulator 100 includes the above described substrate-type optical waveguide 1 as a phase modulating section for carrying out phase modulation with respect to one of branched transferred lights. A phase modulating section for carrying out phase modulation with respect to the other of the branched transferred lights is configured by a substrate-type optical waveguide 1' which has a structure that is symmetrical to that of the substrate-type optical waveguide 1.

EXAMPLE

As a substrate-type optical waveguide in accordance with Example, a substrate-type optical waveguide 1 was produced in which the constituent members had the following sizes, and a lower cladding layer capacitance C2 was measured.

Width $W_R$ of rib part 131=0.6 μm;
Width $W_{S1}$ of first slab part 132a=9.7 μm;
Width $W_{S2}$ of second slab part 132b=3.7 μm;
Width WN of N-type semiconductor region 13N=10 μm;
Width of high-doped region 13N1=9 μm;
Width of low-doped region 13N2=1 μm;
Width WP of P-type semiconductor region 13P=4 μm;
Width of high-doped region 13P1=3 μm;
Width of low-doped region 13P2=1 μm;
Thickness of lower cladding layer 12=3.0 μm;
Dielectric constant of lower cladding layer 12=approximately 3.8;
Width of first electrode 15a (ground electrode)=100 μm;
Width Wx of part of first electrode 15a which part directly faces with base layer 11=97.0 μm;
Width of second electrode 15b (signal electrode)=5 μm;
Width Wy of part of second electrode 15b which part directly faces with base layer 11=2.0 μm; and
Distance between first electrode 15a and second electrode 15b=8 μm.

Moreover, as a substrate-type optical waveguide in accordance with Comparative Example, a substrate-type optical waveguide 1 was produced in which sizes of the constituent members were changed as follows, and a lower cladding layer capacitance C2 was measured.

Width $W_R$ of rib part 131=0.6 μm;
Width $W_{S1}$ of first slab part 132a=6.7 μm;
Width $W_{S2}$ of second slab part 132b=6.7 μm;
Width $W_N$ of N-type semiconductor region 13N=7 μm;
Width of high-doped region 13N1=6 μm;
Width of low-doped region 13N2=1 μm;
Width $W_P$ of P-type semiconductor region 13P=7 μm;
Width of high-doped region 13P1=6 μm;
Width of low-doped region 13P2=1 μm;
Thickness of lower cladding layer 12=3 μm;
Dielectric constant of lower cladding layer 12=approximately 3.8;
Width of first electrode 15a (ground electrode)=100 μm;
Width Wx of part of first electrode 15a which part directly faces with base layer 11=97 μm;
Width of second electrode 15b (signal electrode)=5 μm;
Width Wy of part of second electrode 15b which part directly faces with base layer 11=2 μm; and
Distance between first electrode 15a and second electrode 15b=8 μm.

As a result of the measurement, the lower cladding layer capacitance C2 of the substrate-type optical waveguide in accordance with Example was 0.13 pF/mm per unit length. On the other hand, the lower cladding layer capacitance C2 of the substrate-type optical waveguide in accordance with Comparative Example was 0.20 pF/mm per unit length. That is, it was confirmed that the lower cladding layer capacitance C2 of the substrate-type optical waveguide in accordance with Example was smaller than the lower cladding layer capacitance C2 of the substrate-type optical waveguide in accordance with Comparative Example.

[Main Points]

As above described, the substrate-type optical waveguide in accordance with an aspect of the present invention includes: a base layer; a lower cladding layer which is laminated on the base layer; and a core which is a rib-slab type core provided on the lower cladding layer, the core having an N-type semiconductor region, a P-type semiconductor region, and a depletion layer which exists between the M-type semiconductor region and the P-type semiconductor region, the depletion layer existing in a rib part of the core, and, in any cross section of the core, a width of a first slab part of the core being greater than a width of a second slab part of the core so that a width of the N-type semiconductor region which includes a part of the core and the first slab part or the second slab part becomes different from a width of the P-type semiconductor region which includes a part of the core and the second slab part or the first slab part.

According to the configuration, it is possible to decrease the lower cladding layer capacitance C2, as compared with a conventional substrate-type optical waveguide in which a width of a first slab part is equal to a width of a second slab part. Therefore, it is possible to decrease the capacitance C=C1+C2 of the substrate-type optical waveguide without decreasing the depletion layer capacitance C1. That is, it is possible to reduce a high frequency loss without increasing power consumption.

Note that a characteristic impedance $Z_0$ of the substrate-type optical waveguide is represented by $Z_0=(L/C)^{1/2}$. From this, in a case where a configuration is employed in which the capacitance C is decreased while keeping the inductance L constant, the characteristic impedance $Z_0$ would be increased. Therefore, normally, a configuration is employed in which the characteristic impedance $Z_0$ is kept constant by lowering both the capacitance C and the inductance L. In a case where such a configuration is employed, a degree of decrease in high frequency loss which is obtained by the formula (1) becomes greater, as compared with a case where the configuration is employed in which the capacitance C is lowered while the inductance L is kept constant.

The following description will discuss a reason why the lower cladding layer capacitance C2 can be decreased by making the width of the N-type semiconductor region different from the width of the P-type semiconductor region.

That, is, the lower cladding layer capacitance C2 is a synthetic capacitance of a capacitance $C_N$ between the N-type semiconductor region and the base layer and a capacitance $C_P$ between the P-type semiconductor region and the base layer. The capacitance $C_N$ and the capacitance $C_P$ are connected in series and therefore the lower cladding layer capacitance C2 is obtained by a formula (2) below.

$$1/C2=1/C_N+1/C_P \qquad (2)$$

In a case where a longer side length of the core is L, a capacitance $c_N = C_N/L$ per a unit length between the N-type semiconductor region and the base layer, and a capacitance $c_P = C_P/L$ per a unit length between the P-type semiconductor region and the base layer are obtained by a formula (3) and a formula (4) below. Here, ε represents a dielectric constant of the lower cladding layer, and d represents a thickness of the lower cladding layer. Moreover, $W_N$ is a width of the N-type semiconductor region in the cross section of the core, and $W_P$ is a width of the P-type semiconductor region in the cross section of the core.

$$c_N = \varepsilon/d \times W_N \quad (3)$$

$$c_P = \varepsilon/d \times W_P \quad (4)$$

Therefore, the lower cladding layer capacitance C2 can be obtained by a formula (5) below.

$$C2 \propto W_N \times W_P/(W_N + W_P) \quad (5)$$

In a case where $W_N + W_P = W$ (constant), $C2 \propto (W - W_P) \times W_P/W$ holds true, and a differential $dC2/dW_P$ is obtained by a formula (6) below.

$$dC2/dW_P \propto 1 - 2 \times W_P/W$$

Therefore, the lower cladding layer capacitance C2 becomes a maximum when the width $W_N$ of the N-type semiconductor region is equal to the width $W_P$ of the P-type semiconductor region ($W_N = W_P = W/2$). This means that the lower cladding layer capacitance C2 becomes smaller when the width $W_N$ of the N-type semiconductor region is made different from the width $W_P$ of the P-type semiconductor region.

In the substrate-type optical waveguide in accordance with an aspect of the present invention, the width of the first slab part in the any cross section of the core is preferably greater than a sum of the width of the second slab part and the width of the rib part.

According to the configuration, it is possible to make the width of the N-type semiconductor region, different from the width, of the P-type semiconductor region, regardless of a location of the depletion layer in the rib part. This makes it possible to decrease the lower cladding layer capacitance C2, as compared with the conventional substrate-type optical waveguide in which the width of the first slab part is equal to the width of the second slab part. Therefore, it is possible to decrease the capacitance C=C1+C2 of the substrate-type optical waveguide without decreasing the depletion layer capacitance C1. That is, it is possible to reduce the high frequency loss without increasing the power consumption.

In the substrate-type optical waveguide in accordance with an aspect of the present invention, it is preferable that the N-type semiconductor region includes the first slab part and a part of the rib part, and the P-type semiconductor region includes the second slab part and a part of the rib part.

A mobility of carriers in the N-type semiconductor region is higher than a mobility of carriers in the P-type semiconductor region. Therefore, according to the configuration, it is possible to reduce a resistance R of the substrate-type optical waveguide that is expressed in the formula (1) as compared with a case where a region constituting the N-type semiconductor region and the P-type semiconductor region are inverted. As a result, it is possible to reduce the high frequency loss.

It is preferable that the substrate-type optical waveguide in accordance with an aspect of the present invention further includes: an upper cladding layer which is laminated on the lower cladding layer such that the core is embedded between the lower cladding layer and the upper cladding layer; and a pair of electrodes which is provided on the upper cladding layer, the pair of electrodes including (i) a first electrode that is connected with the N-type semiconductor region and (ii) a second electrode that is connected with the P-type semiconductor region, a width of a part of the first electrode which part, faces with the base layer without via the core being greater than a width of a part of the second electrode which part faces with the base layer without via the core.

In a case where the first electrode has the part which faces with the base layer without via the core, a capacitance between the first electrode and the base layer is added to the capacitance $C_N$ between the N-type semiconductor region and the base layer. Similarly, in a case where the second electrode has the part which faces with the base layer without via the core, a capacitance between the second electrode and the base layer are added to the capacitance $C_P$ between the P-type semiconductor region and the base layer. According to the configuration, even in such a case, the lower cladding layer capacitance C2 does not become a maximum. Therefore, according to the configuration, even in such a case, it is possible to decrease the lower cladding layer capacitance C2, as compared with the conventional substrate-type optical waveguide in which the width of the first slab part is equal to the width of the second slab part.

In the substrate-type optical waveguide in accordance with an aspect of the present invention, it is preferable that the pair of electrodes constitutes a coplanar line; and a width of one of the first electrode and the second electrode which one serves as a ground electrode is greater than a width of another one of the first electrode and the second electrode which another one serves as a signal electrode.

According to the configuration, it is possible to reduce crosstalk between signal electrodes which are adjacent to each other via the ground electrode, as compared with a case where a width of a ground electrode is smaller than a width of a signal electrode.

In the substrate-type optical waveguide in accordance with an aspect of the present invention, it is preferable that a concentration of a dopant (additive) which is added so as to cause the N-type semiconductor region to serve as an N-type semiconductor is, in the first slab part, lower on a side near to the P-type semiconductor region and higher on a side far from the P-type semiconductor region; and a concentration of a dopant (additive) which is added so as to cause the P-type semiconductor region to serve as a P-type semiconductor is, in the second slab part, lower on a side near to the N-type semiconductor region and higher on a side far from the N-type semiconductor region.

According to the configuration, it is possible to lower a concentration of a dopant in a region in which light propagating through the core is unevenly distributed (i.e., in the rib part and the vicinity thereof), as compared with a case where concentrations of dopants are uniform in the N-type semiconductor region and the P-type semiconductor region. Therefore, it is possible to reduce a loss caused when the light propagating through the core is reflected, scattered, or absorbed by the dopant.

In the substrate-type optical waveguide in accordance with an aspect of the present invention, it is preferable that the N-type semiconductor region and the P-type semiconductor region face with each other via a plane that is perpendicular to an upper surface of the lower cladding layer and a cross section of the core.

According to the configuration, it is possible to easily form the N-type semiconductor region and the P-type semiconductor region, as compared with the conventional substrate-type optical waveguide in which the N-type semiconductor region and the P-type semiconductor region face with each other via a stairs-like surface (see Patent Literature 1). This makes it possible to reduce a cost of producing the substrate-type optical waveguide.

In the substrate-type optical waveguide in accordance with an aspect of the present invention, it Is preferable that each of the base layer and the core contains silicon as a main component, and the lower cladding layer contains silica as a main component.

According to the configuration, it is possible to produce the substrate-type optical waveguide from a silicon on insulator (SOI) substrate. This makes it possible to reduce a cost of producing the substrate-type optical waveguide.

The substrate-type optical modulator in accordance with another aspect of the present invention includes the above described substrate-type optical waveguide as a phase modulating section.

According to the configuration, it is possible to reduce the high frequency loss also in the substrate-type optical modulator, without increasing power consumption.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention.

| Reference Signs List | |
| --- | --- |
| Substrate-type optical waveguide | 1 |
| Base layer | 11 |
| Lower cladding layer | 12 |
| Core | 13 |
| Rib part | 131 |
| First slab part | 132a |
| Second slab part | 132b |
| N-type semiconductor region | 13N |
| High-doped region | 13N1 |
| Low-doped region | 13N2 |
| P-type semiconductor region | 13P |
| High-doped region | 13P1 |
| Low-doped region | 13P2 |
| Depletion layer | 13I |
| Upper cladding layer | 14 |
| Pair of electrodes | 15 |
| Ground electrode (first electrode) | 15a |
| Signal electrode (second electrode) | 15b |
| Substrate-type optical modulator | 100 |

The invention claimed is:

1. A substrate-type optical waveguide, comprising:
a base layer;
a lower cladding layer which is laminated on the base layer; and
a core which is a rib-slab type core provided on the lower cladding layer, the core having an N-type semiconductor region, a P-type semiconductor region, and a depletion layer which exists between the N-type semiconductor region and the P-type semiconductor region,
the core including:
a rib part; and
first and second slab parts which are located on both sides of the rib part and which are smaller in thickness than the rib part,
and,
in any cross section of the core, a width of the first slab part of the core being greater than a width of the second slab part of the core.

2. The substrate-type optical waveguide as set forth in claim 1, wherein:
in the any cross section of the core, the width of the first slab part is greater than a sum of the width of the second slab part and the width of the rib part.

3. The substrate-type optical waveguide as set forth in claim 1, wherein:
each of the base layer and the core contains silicon as a main component; and
the lower cladding layer contains silica as a main component.

4. A substrate-type optical modulator comprising a substrate-type optical waveguide recited in claim 1 as a phase modulating section.

5. The substrate-type optical waveguide as set forth in claim 1, wherein:
the depletion layer exists in the rib part of the core; and
in any cross section of the core, the width of the first slab part of the core is greater than the width of the second slab part of the core so that a width of the N-type semiconductor region which includes a part of the core and the first slab part or the second slab part becomes different from a width of the P-type semiconductor region which includes a part of the core and the second slab part or the first slab part.

6. The substrate-type optical waveguide as set forth in claim 5, wherein: the N-type semiconductor region includes the first slab part and a part of the rib part, and the P-type semiconductor region includes the second slab part and a part of the rib part.

7. The substrate-type optical waveguide as set forth in claim 5, further comprising: an upper cladding layer which is laminated on the lower cladding layer such that the core is embedded between the lower cladding layer and the upper cladding layer; and a pair of electrodes which is provided on the upper cladding layer, the pair of electrodes including (i) a first electrode that is connected with the N-type semiconductor region and (ii) a second electrode that is connected with the P-type semiconductor region, a width of a part of the first electrode which part faces with the base layer without via the core being greater than a width of a part of the second electrode which part faces with the base layer without via the core.

8. The substrate-type optical waveguide as set forth in claim 7, wherein: the pair of electrodes constitutes a coplanar line; and a width of one of the first electrode and the second electrode which one serves as a ground electrode is greater than a width of another one of the first electrode and the second electrode which another one serves as a signal electrode.

9. The substrate-type optical waveguide as set forth in claim 5, wherein: a concentration of an additive which is added so as to cause the N-type semiconductor region to serve as an N-type semiconductor is, in the first slab part, lower on a side near to the P- type semiconductor region and higher on a side far from the P-type semiconductor region; and a concentration of an additive which is added so as to cause the P-type semiconductor region to serve as a P-type semiconductor is, in the second slab part, lower on a side near to the N-type semiconductor region and higher on a side far from the N-type semiconductor region.

10. The substrate-type optical waveguide as set forth in claim 5, wherein: the P-type semiconductor region and the N-type semiconductor region face with each other via a plane that is perpendicular to an upper surface of the lower cladding layer and a cross section of the core.

* * * * *